US008656810B2

(12) United States Patent
Kobayashi

(10) Patent No.: US 8,656,810 B2
(45) Date of Patent: Feb. 25, 2014

(54) WAVE-TYPE LINEAR MOTION MECHANISM

(75) Inventor: Masaru Kobayashi, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 302 days.

(21) Appl. No.: 13/266,163

(22) PCT Filed: Jun. 2, 2009

(86) PCT No.: PCT/JP2009/002462
§ 371 (c)(1), (2), (4) Date: Oct. 25, 2011

(87) PCT Pub. No.: WO2010/140188
PCT Pub. Date: Dec. 9, 2010

(65) Prior Publication Data
US 2012/0036951 A1    Feb. 16, 2012

(51) Int. Cl.
| F16H 27/02 | (2006.01) |
| F16H 29/02 | (2006.01) |
| F16H 33/00 | (2006.01) |
| F16H 35/00 | (2006.01) |
| F16H 37/00 | (2006.01) |

(52) U.S. Cl.
USPC .............................................. 74/640; 74/89

(58) Field of Classification Search
USPC ......... 74/640, 89, 89.23, 89.36, 89.38, 89.39, 74/89.43, 424.78, 424.94, 411.5
See application file for complete search history.

(56) References Cited

U.S. PATENT DOCUMENTS

| 4,557,153 A * | 12/1985 | Ulbing ................................ 74/2 |
| 5,370,011 A * | 12/1994 | Gilges et al. ...................... 74/89 |
| 5,511,438 A * | 4/1996 | Aki ................................ 74/89.43 |
| 6,893,371 B2 * | 5/2005 | Mills et al. ...................... 475/149 |
| 7,748,308 B2 * | 7/2010 | Anderson et al. ................. 91/61 |
| 8,191,439 B2 * | 6/2012 | Kobayashi et al. ........... 74/89.23 |
| 2005/0253675 A1 * | 11/2005 | Davison ........................ 335/220 |

FOREIGN PATENT DOCUMENTS

| JP | 2-98241 U | 8/1990 |
| JP | 4-83944 A | 3/1992 |
| JP | 6-38195 Y2 | 10/1994 |
| JP | 2001-95287 A | 4/2001 |
| JP | 2007-154955 A | 6/2007 |
| JP | 2008-75799 A | 4/2008 |

OTHER PUBLICATIONS

International Search Report (PCT/ISA/210) issued on Aug. 11, 2009, by Japanese Patent Office as the International Searching Authority for International Application No. PCT/JP2009/002462.

* cited by examiner

Primary Examiner — Troy Chambers
Assistant Examiner — Jake Cook
(74) Attorney, Agent, or Firm — Buchanan Ingersoll & Rooney PC

(57) ABSTRACT

Disclosed is a wave-type linear motion mechanism including a hydraulic pressure chamber for applying a retention force in the axial direction to a rigid screw member which moves in a linear fashion. Regulating valves are provided in the hydraulic pressure chamber, and these regulating valves open during the rotation of a wave generator so that no hydraulic pressure is exerted on the rigid screw member which moves in a linear fashion. During the rotation of the wave generator the regulating valves close to establish an airtight state in the hydraulic pressure chamber, and a hydraulic pressure is exerted as a retention force on the rigid screw member. Although restricted by the meshing strength between the rigid screw member and a flexible screw member and the buckling strength of the flexible screw member, the retention force of the wave-type linear motion mechanism is able to be increased.

5 Claims, 3 Drawing Sheets

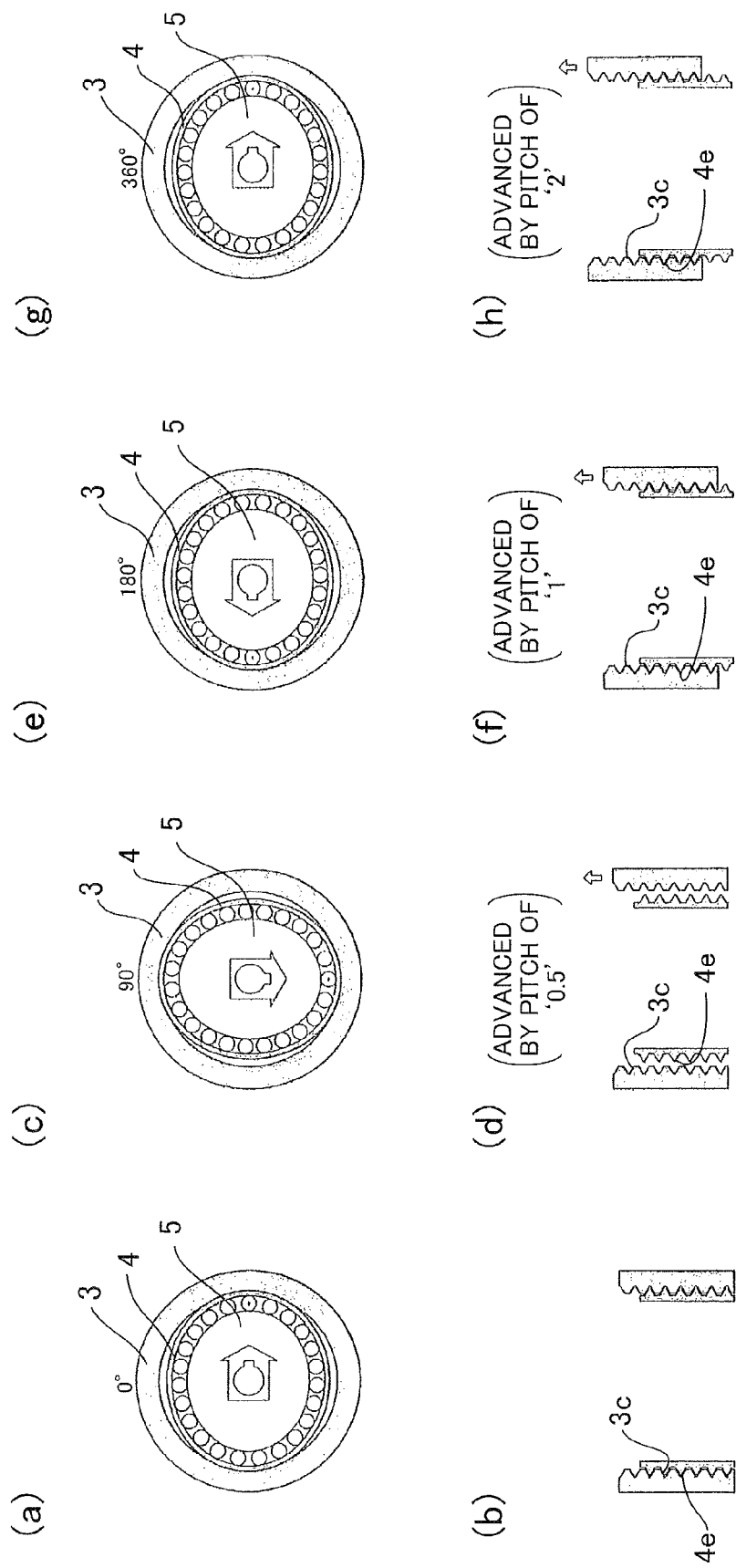

WAVE-TYPE LINEAR MOTION MECHANISM

TECHNICAL FIELD

The present invention relates to a wave-type linear motion mechanism for causing partial meshing of a rigid screw member and a flexible screw member, which is capable of flexing in a radial direction, the rigid screw member and the flexible screw member having different leads, and for moving the meshing positions of the screws in a circumferential direction, whereby relative linear movement is generated between the screw members. In particular, the present invention relates to a wave-type linear motion mechanism that is improved so that a retention force can be increased in stopped states.

BACKGROUND ART

Wave-type linear motion mechanisms generally comprise a rigid screw member formed with a female screw, a flexible screw member that can flex in the radial direction and is formed with a male screw, and a wave generator that has an elliptical contour and serves to create a state in which the flexible screw member is flexed into an elliptical shape and made to partially mesh with the rigid screw member at positions on the major axis of the elliptical shape. The leads of the female screw of the rigid screw member and the male screw of the flexible screw member are different. When the wave generator rotates, the meshing positions of both move in the circumferential direction, and relative linear motion is generated between the two in the axial direction. If one of the members is immobilized, the other member moves linearly in the axial direction, and members that are connected to that member can be, e.g., positioned in the axial direction. Wave-type linear motion mechanisms having this configuration are disclosed in Patent Document 1 (Japanese Utility Model Publication No. 6-38195) and Patent Document 2 (Japanese Patent Laid-Open No. 2007-154955).

PRIOR ART DOCUMENTS

Patent Documents

[Patent Document 1] Japanese Utility Model Publication No. 6-38195
[Patent Document 2] Japanese Patent Laid-Open No. 2007-154955

DISCLOSURE OF THE INVENTION

Problems to be Solved by the Invention

When an axial force acts on the mobile-side member (the rigid screw member or the flexible screw member) in a state in which the wave generator is rotationally stopped, shear stress on the meshing portion of the female screw and the male screw, which are meshed by the wave generator, and buckling stress working on the flexible screw member increase. When the axial force is excessive, the stress on these portions becomes too large, and shear fractures of the screw teeth or buckling fractures of the flexible screw member are generated. The magnitude of the external axial force in the operational stop state of the wave-type linear motion mechanism must be limited to a magnitude at which shear fractures and buckling fractures are not generated; i.e., the axial force must be limited to equal or less than the allowable retention force of the wave-type linear motion mechanism.

It is an object of the present invention to propose a wave-type linear motion mechanism in which increased retention force is achieved so as to allow large external axial forces in the operational stop state to be tolerated.

Means Used to Solve the Above-Mentioned Problems

In order to solve the aforementioned problems, according to the present invention, there is provided a wave-type linear motion mechanism comprising a rigid screw member; a circular flexible screw member able to flex in a radial direction; and a wave generator, wherein a female screw is formed on one of the rigid screw member and the flexible screw member, and a male screw is formed on the other, the male screw being capable of meshing with the female screw and having a different lead; one of the rigid screw member and the flexible screw member is an immobile-side member, and the other is a mobile-side member, the immobile-side member not moving in an axial direction, and the mobile-side member being capable of moving in the axial direction; and the wave generator creates a state in which the flexible screw member is flexed into a non-circular shape and made to mesh in at least one location in a circumferential direction with the rigid screw member, causes a meshing position of the two screw members to move in the circumferential direction along with rotation of the wave generator, and generates relative linear motion between the two screw members in the axial direction. The wave-type linear motion mechanism is characterized in having retention-force-generating means for generating at least a part of a retention force for retaining the mobile-side member in a stopped position in the axial direction when the wave generator is in a rotationally stopped state.

A hydraulic pressure chamber can be used for applying hydraulic pressure to the mobile-side member as the retention force for use as the retention-force-generating means. In such instances, the hydraulic pressure chamber may be retained in a sealed state when rotation of the wave generator is stopped, and may be retained in a released state when the wave generator is rotating.

Regulating values for controlling ingress and egress of hydraulic oil with respect to the hydraulic pressure chamber may be used for switching the hydraulic pressure chamber between a sealed state and a released state.

The flexible screw member that is used can comprise a cup-shaped member and a male screw, the cup-shaped member being able to flex in a radial direction, the male screw being formed on a circular outer-circumferential surface portion on an open end of the cup-shaped member, and a rigid boss being integrally formed on a bottom part of the cup-shaped member. The rigid screw member that is used can have a cylindrical member and a female screw, the cylindrical member coaxially surrounding the flexible screw member, and the female screw being formed on a circular inner circumferential surface of the cylindrical member.

In such instances, a cylindrical mechanism housing can be disposed for coaxially surrounding the rigid screw member. The rigid screw member can be supported by the mechanism housing in a state allowing sliding in the axial direction. The hydraulic pressure chamber can be formed between the rigid boss and an end part of the mechanism housing toward the rigid boss, the hydraulic pressure chamber being annular.

If a part of the hydraulic pressure chamber is divided by an end part of the cylindrical member of the rigid screw member, hydraulic pressure can be applied to the cylindrical member as the retention force.

In such instances, an outside annular gap between an outer circumferential surface of the end part of the cylindrical member and an inner circumferential surface of the mechanism housing, and an inside annular gap between an inner circumferential surface of the end part and the an outer circumferential surface of the rigid boss may be sealed in a state allowing sliding of the cylindrical member in the axial direction. The regulating valves may be respectively disposed in the outside annular gap and the inside annular gap.

Effect of the Invention

The wave-type linear motion mechanism of the present invention is provided with retention-force-generating means which is, for example, composed of a hydraulic pressure chamber having attached regulating valves that open and close in concert with the wave generator. The axial force that acts from the outside when operation is stopped is therefore accepted both by a mechanical retention force of the wave-type linear motion mechanism and by the hydraulic pressure of the retention-force-generating means and other retention forces, in which the mechanical retention force of the wave-type linear motion mechanism is defined by the shear strength at the point of meshing of the female screw and the male screw and by the buckling strength of the flexible screw member. A wave-type linear motion mechanism provided with a large retention force can therefore be implemented.

BRIEF DESCRIPTION OF THE DRAWINGS

FIG. 3 is a descriptive diagram that shows principles of operation of the wave-type linear motion mechanism of FIG. 1.

MODE FOR CARRYING OUT THE INVENTION

Embodiments of a wave-type linear motion mechanism in which the present invention is applied will be described below with reference to the drawings.

Figure 1:
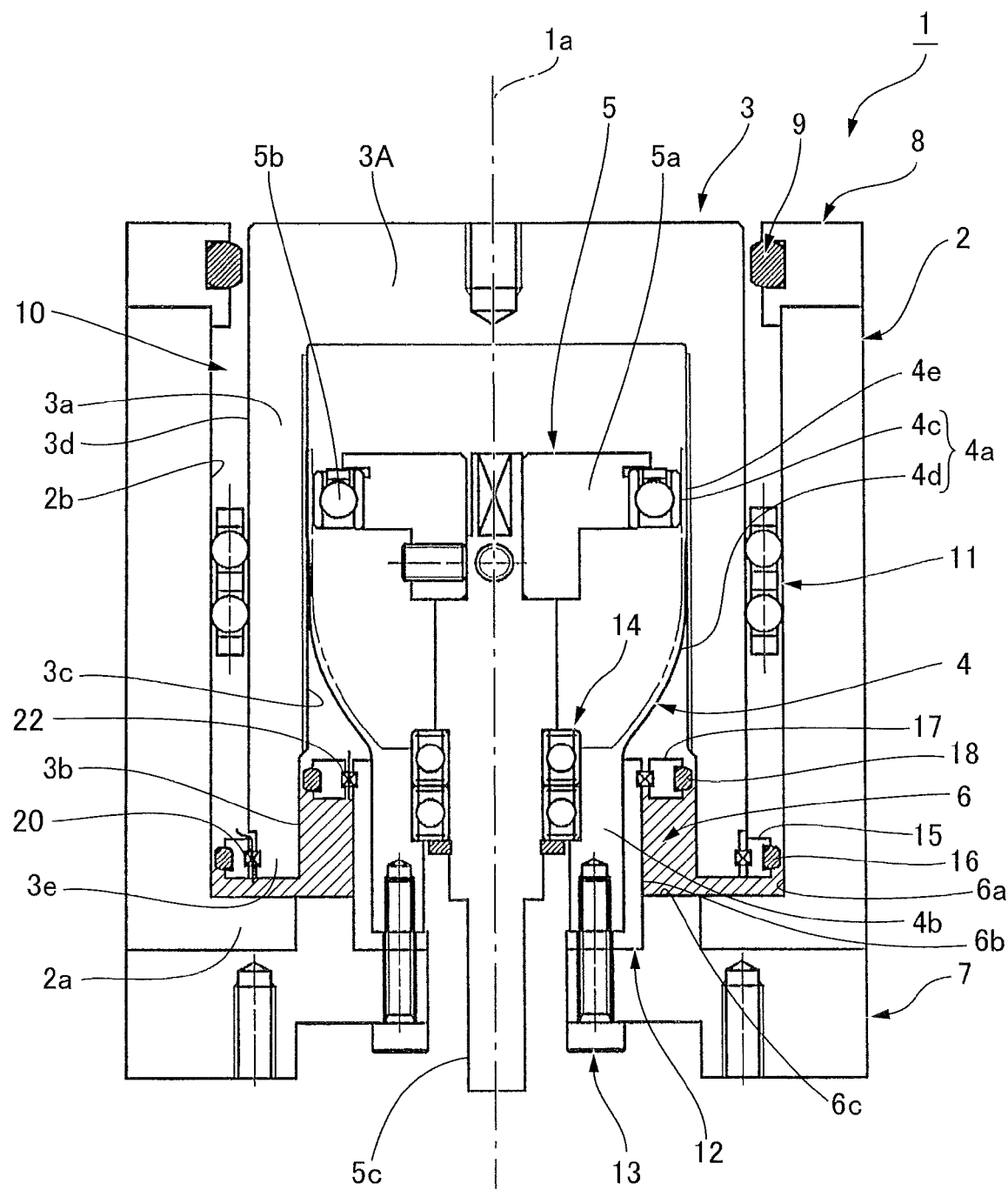
FIG. 1 is a schematic longitudinal sectional view that shows a wave-type linear motion mechanism in which the present invention is applied.
Figure 2:
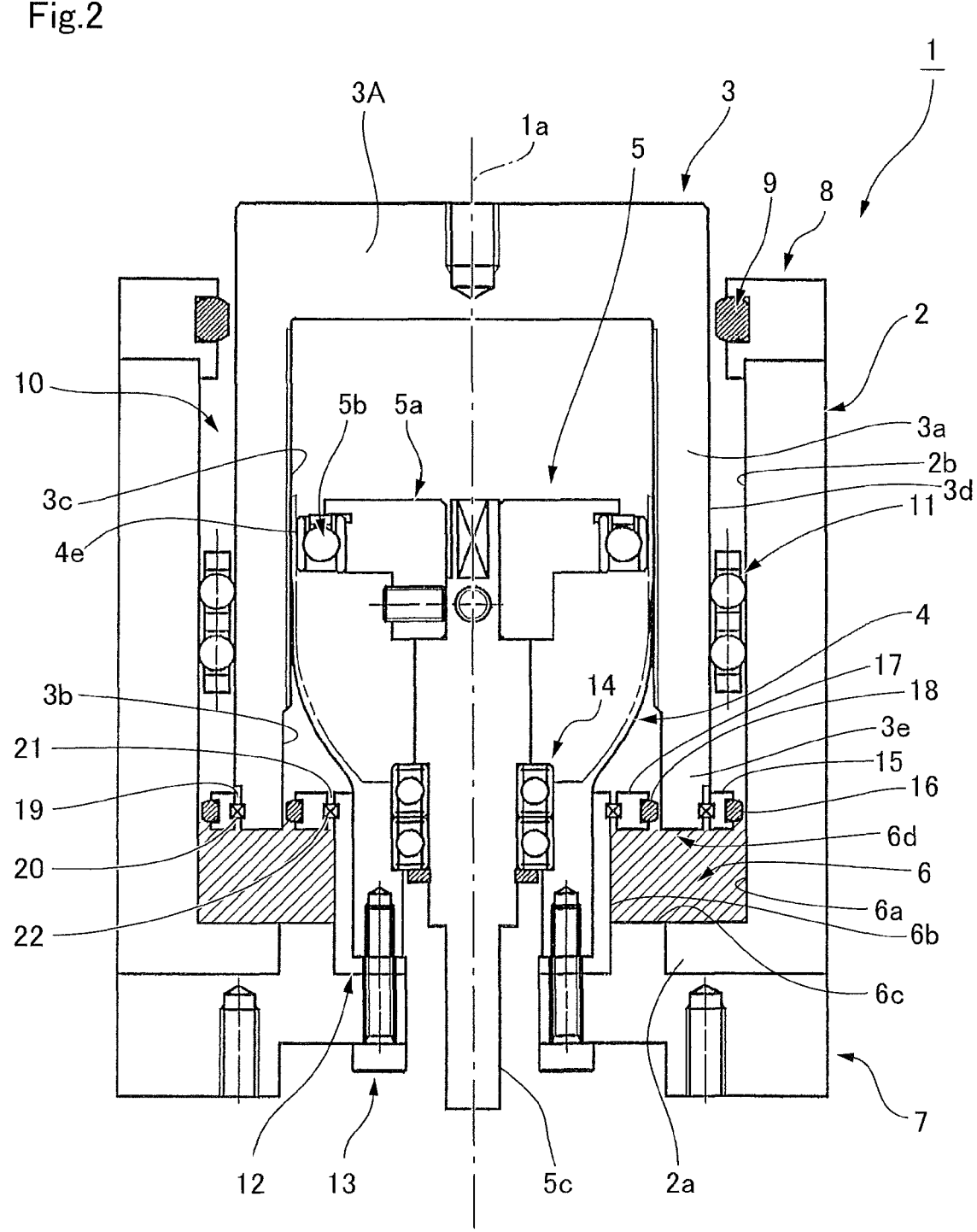
FIG. 2 is a schematic longitudinal sectional view that shows the wave-type linear motion mechanism of FIG. 1.

FIGS. 1 and 2 are schematic longitudinal sectional views that show a wave-type linear motion mechanism according to the present embodiment. A wave-type linear motion mechanism 1 has a cylindrical mechanism housing 2, a rigid screw member 3 disposed coaxially therein, a flexible screw member 4 disposed coaxially therein, and a wave generator 5 positioned coaxially therein. The wave-type linear motion mechanism 1 also has a hydraulic pressure chamber 6 that is formed between the cylindrical mechanism housing 2, the rigid screw member 3, and the flexible screw member 4 and is used for generating a retention force.

An annular flange 2a that expands at a right angle toward the inside in the radial direction is formed on a proximal end (one end in an axial direction 1a) of the mechanism housing 2. An annular end plate 7 is coaxially fastened and immobilized to a proximal-end surface of the annular flange 2a. An annular member 8 is coaxially fixed to a distal end of the mechanism housing 2. An O-ring 9 that is mounted on a circular inner-circumferential surface of the annular member 8 is used to seal the gap between a distal-end portion of the mechanism housing 2 and a distal-end portion of the rigid screw member 3 in a state that allows relative movement.

The rigid screw member 3 is provided with a cylindrical trunk part 3a. The cylindrical trunk part 3a is open at a proximal end and is blocked by a disk-shaped end-plate portion 3A on the distal end. The proximal-end portion of a circular inner-circumferential surface of the cylindrical trunk part 3a continues as a circular inner-circumferential surface 3b, but a female screw 3c is formed on the other portions. An annular gap 10 is formed between a circular outer-circumferential surface 3d of the cylindrical trunk part 3a and a circular inner-circumferential surface 2b of the mechanism housing 2. The rigid screw member 3 is supported by the mechanism housing 2 in a state that allows movement in the axial direction 1a via a linear-motion bearing 11 mounted in the annular gap 10. A distal opening of the annular gap 10 is sealed by the O-ring 9.

The flexible screw member 4 is provided with a cup-shaped portion 4a that can flex in the radial direction. A rigid cylindrical boss 4b is integrally and coaxially formed on a bottom part (proximal end) of the cup-shaped portion 4a. The cup-shaped portion 4a is provided with a cylindrical trunk part 4c and a curved diaphragm 4d that is formed between the cylindrical trunk part 4c and an outer-circumferential edge portion on an end surface of the rigid cylindrical boss 4b. A male screw 4e is formed on an outer circumferential portion on an open end of the cylindrical trunk part 4c. The male screw 4e can mesh with the female screw 3c, but the lead is different from the female screw 3c. The rigid cylindrical boss 4b of the flexible screw member 4 sandwiches a collar 12 and is coaxially and fixedly fastened on an inner circumferential edge portion of the annular end plate 7 of the mechanism housing 2 by a plurality of fastening bolts 13.

The wave generator 5 is provided with a rigid cam plate 5a that has an elliptical contour, a wave bearing 5b that is mounted on an outer circumferential surface of the rigid cam plate 5a, and an input shaft 5c that is coaxially fixed to the rigid cam plate 5a. The wave bearing 5b is a ball bearing configured from an outer race and an inner race that can flex in the radial direction, and a plurality of balls that are mounted between these races. The wave bearing supports the rigid cam plate 5a and the flexible screw member 4 in a state that allows relative rotation. The input shaft 5c extends to the rear coaxially through the inside of the rigid cylindrical boss 4b of the flexible screw member 4 and is rotatably supported by the rigid cylindrical boss 4b via a bearing 14 mounted therebetween. The input shaft 5c is connected to a motor output shaft or other rotating shaft (not shown).

The hydraulic pressure chamber 6 has an annular shape. A circular inner circumferential surface 6a outside the chamber is defined by a proximal portion of the circular inner-circumferential surface 2b of the mechanism housing 2. A circular outer circumferential surface 6b inside the chamber is defined by a circular outer circumferential surface of the collar 12 attached in a state surrounding the outer circumference of the rigid cylindrical boss 4b. An annular bottom surface 6c of the chamber is defined by an annular end surface of the annular flange 2a of the mechanism housing 2 and an annular end surface of the annular end plate 7. An annular upper-surface opening 6d of the hydraulic pressure chamber 6 is blocked by an annular proximal portion 3e of the cylindrical trunk part 3a of the rigid screw member 3; an outside ring 15 having a rectangular cross-section and an outside O-ring 16 that are coaxially disposed outside the annular proximal portion 3e; and an inside ring 17 having a rectangular cross-section and an inside O-ring 18 that are coaxially disposed inside the annular proximal portion 3e.

The outside ring 15 is fixed on an outer circumferential surface of the annular proximal portion 3e of the rigid screw member 3, and the outside O-ring 16 is mounted on the outer circumferential surface of the outside ring 15. The outside O-ring 16 allows the rigid screw member 3 to slide in the axial direction 1a in a state in which the gap between the outside ring 15 and the inner circumferential surface 2b of the mechanism housing 2 is sealed. In contrast, the inside ring 17 is fixed on a circular outer circumferential surface of the collar 12, and the inside O-ring 18 is mounted on the outer circumferential surface of the inside ring 17. The inside O-ring 18 allows the rigid screw member 3 to slide in the axial direction 1a in a state in which the gap between the inside ring 17 and the circular inner-circumferential surface 3b of the rigid screw member 3 is sealed.

An annular gap 19 is formed between an inner circumferential surface of the outside ring 15 and an outer circumferential surface of the annular proximal portion 3e of the rigid screw member 3, and a regulating valve 20 that can open and close the annular gap 19 is provided in the annular gap 19. In the same fashion, an annular gap 21 is also formed between an inner circumferential surface of the inside ring 17 and an outer circumferential surface of the collar 12, and a regulating valve 22 that can open and close the annular gap 21 is provided in the gap 21. The regulating valves 20, 22 are, e.g., electromagnetic valves and are opened and closed in concert with the rotation of the wave generator 5. When the wave generator 5 is in a stopped state, the regulating valves 20, 22 are retained in a closed state. When the wave generator 5 is rotating, the regulating valves 20, 22 are switched to an open state, are retained in the open state during a period that ends when the wave generator 5 stops (during rotation), and are switched to the closed state when the wave generator 5 stops. The hydraulic pressure chamber 6 enters a sealed state when the regulating valves 20, 22 close, and the hydraulic pressure chamber 6 enters a released state when the regulating valves 20, 22 open.

The spaces inside and outside of the rigid screw member 3 are communicatingly connected to the hydraulic pressure chamber 6 via the regulating valves 20, 22 and function as lubricant supply lines. Lubricant is supplied from a lubricant injection inlet (not shown) through these lubricant supply lines to locations to be lubricated within the wave-type linear motion mechanism 1. During operation, the regulating valves 20, 22 are open, and the hydraulic pressure chamber 6 is retained in a released state, and therefore lubricant flows through the hydraulic pressure CHAMBER 6.

DESCRIPTION OF OPERATION

FIG. 3 is a descriptive diagram of the operation of the wave-type linear motion mechanism 1. In the wave-type linear motion mechanism 1, the cylindrical housing 2 and the flexible screw member 4 linked and immobilized on the housing are immobile-side members, and the rigid screw member 3 is a mobile-side member that can move in the direction of the center axis line 1a.

As shown in FIGS. 3(a) and 3(b), the portion at which the male screw 4e of the flexible screw member 4 is formed is made to flex into an elliptical shape by the elliptical wave generator 5. The male screw 4e meshes with the female screw 3c of the outside rigid screw member 3 at the portions on both major-axial ends of the elliptical shape.

The position of the major axis moves in the circumferential direction when the wave generator 5 is made to rotate, and the meshing positions of the flexible screw member 4 with respect to the rigid screw member 3 therefore also move in the circumferential direction along therewith. The rigid screw member 3 is pushed out in the axial direction 1a along with the movement of the meshing position. In cases where the difference in thread number between the male screw 4e and the female screw 3c is "2," when the wave generator 5 rotates 90°, the rigid screw member 3 advances by a pitch of 0.5, as shown in FIGS. 3(c) and 3(d). When the wave generator 5 rotates 180°, the rigid screw member 3 advances by a pitch of 1, as shown in FIGS. 3(e) and 3(f). When the wave generator 5 rotates 360°, the rigid screw member 3 advances by a pitch of 2, as shown in FIGS. 3(g) and 3(h). The rigid screw member 3 advances and retreats according to the direction of rotation of the wave generator 5. Operations for, e.g., positioning in the axial direction 1a of members and the like attached to the rigid screw member 3 can therefore be performed.

During operation, i.e., during rotation of the wave generator 5, the regulating valves 20, 22 are retained in an open state. The flow of lubricant through the hydraulic pressure chamber 6 is therefore ensured. For example, when the rigid screw member 3 is at the initial, maximally retreated position, the volume of the hydraulic pressure chamber 6 is at a minimum, as shown in FIG. 1, and when the rigid screw member 3 has maximally advanced, the volume of the hydraulic pressure chamber 6 is also at a maximum, as shown in FIG. 2.

When stopped, i.e., when the rotation of the wave generator 5 has been stopped, the regulating valves 20, 22 are retained in a closed state, and the hydraulic pressure chamber 6 is in a sealed state. As a result, axial force acting on the rigid screw member 3 can be received by the hydraulic pressure of the hydraulic pressure chamber 6 in either the retreated position or the advanced position shown in FIG. 1 or 2. The retention force of the wave-type linear motion mechanism 1, which force is constrained by the shear strength at the screw-meshing points between the rigid screw member 3 and the flexible screw member 4 and by the buckling strength of the flexible screw member 4, can therefore be greatly enhanced.

OTHER EMBODIMENTS

In the aforedescribed embodiment, the female screw 3c was formed on the circular inner circumferential surface of the rigid screw member 3, and the male screw 4e was formed on the circular outer circumferential surface of the flexible screw member 4. A male screw may instead be formed on a circular outer circumferential surface of the rigid screw member 3, and a female screw may be formed on a circular inner circumferential surface of the flexible screw member 4. In such instances, the flexible screw member is disposed in a state surrounding the outside of the rigid screw member, and a wave generator provided with an elliptical contour on the inner circumferential surface is disposed in a state surrounding the outside of the flexible screw member. The wave generator causes the flexible screw member to be flexed into an elliptical shape and causes both screws to be meshed at portions on both ends of the minor axis of the elliptical shape. The meshing positions move in the circumferential direction along with the rotation of the wave generator, and relative linear motion is generated between the two screw members in the same manner as in the aforedescribed embodiment.

A hydraulic-pressure mechanism was used as the retention-force-generating means in the aforedescribed embodiment. A frictional engagement mechanism, such as a friction clutch, or another mechanical engagement mechanism can instead be used to bear the retention force.

[Key]
1 Wave-type linear motion mechanism
1a Radial direction
2 Mechanism housing 3 Rigid screw member
3a Cylindrical trunk part
3A Disk-shaped end-plate portion
3b Circular inner-circumferential surface
3c Female screw
4 Flexible screw member
4a Cup-shaped portion
4b Rigid cylindrical boss
4c Cylindrical trunk part
4d Diaphragm
4e Male screw
5 Wave generator
5a Rigid cam plate
5b Wave bearing
5c Input shaft
6 Hydraulic pressure chamber
6a Circular inner circumferential surface
6b Circular outer circumferential surface
6c Annular bottom surface
6d Annular upper-surface opening
7 Annular end plate
8 Annular member
9 O-ring
10 Annular gap
11 Linear-motion bearing
12 Collar
13 Fastening bolts
14 Shaft bearing
15 Outside ring
16 Outside O-ring
17 Inside ring
18 Inside O-ring
19, 21 Annular gaps
20, 22 Regulating valves

The invention claimed is:

1. A wave-type linear motion mechanism comprising:
a rigid screw member;
a circular flexible screw member able to flex in a radial direction; and
a wave generator, wherein
a female screw is formed on one of the rigid screw member and the flexible screw member, and a male screw is formed on the other, the male screw being capable of meshing with the female screw and having a different lead;
one of the rigid screw member and the flexible screw member is an immobile-side member, and the other is a mobile-side member, the immobile-side member not moving in an axial direction, and the mobile-side member being capable of moving in the axial direction; and
the wave generator creates a state in which the flexible screw member is flexed into a non-circular shape and made to mesh in at least one location in a circumferential direction with the rigid screw member, causes a meshing position of the two screw members to move in the circumferential direction along with rotation of the wave generator, and generates relative linear motion between the two screw members in the axial direction, the wave-type linear motion mechanism having
retention-force-generating means for generating at least a part of a retention force for retaining the mobile-side member in a stopped position in the axial direction when the wave generator is in a rotationally stopped state.

2. The wave-type linear motion mechanism according to claim 1, wherein
the retention-force-generating means comprises a hydraulic pressure chamber for applying hydraulic pressure to the mobile-side member as the retention force, wherein
the hydraulic pressure chamber is retained in a sealed state when rotation of the wave generator is stopped, and is retained in a released state when the wave generator is rotating.

3. The wave-type linear motion mechanism according to claim 2, wherein
the retention-force-generating means comprises regulating values for controlling ingress and egress of hydraulic oil with respect to the hydraulic pressure chamber, wherein
the regulating valves switch to a closed state and retain the hydraulic pressure chamber in a sealed state when the rotation of the wave generator is stopped, and switch to an open state and retain the hydraulic pressure chamber in a released state when the wave generator is rotating.

4. The wave-type linear motion mechanism according to claim 3, wherein
the flexible screw member comprises a cup-shaped member and a male screw, the cup-shaped member being able to flex in a radial direction, the male screw being formed on a circular outer-circumferential surface portion on an open end of the cup-shaped portion, and a rigid boss being integrally formed on a bottom part of the cup-shaped portion;
the rigid screw member has a cylindrical member and a female screw, the cylindrical member coaxially surrounding the flexible screw member, and the female screw being formed on a circular inner circumferential surface of the cylindrical member;
a cylindrical mechanism housing is disposed for coaxially surrounding the rigid screw member;
the rigid screw member is supported by the mechanism housing in a state allowing sliding in the axial direction;
the hydraulic pressure chamber is formed between the rigid boss and an end part of the mechanism housing toward the rigid boss, the hydraulic pressure chamber being annular; and
a part of the hydraulic pressure chamber is divided by an end part of the cylindrical member of the rigid screw member.

5. The wave-type linear motion mechanism according to claim 4, wherein
an outside annular gap between an outer circumferential surface of the end part of the cylindrical member and an inner circumferential surface of the mechanism housing, and an inside annular gap between an inner circumferential surface of the end part and an outer circumferential surface of the rigid boss are sealed in a state allowing sliding of the cylindrical member in the axial direction; and
the regulating valves are respectively disposed in the outside annular gap and the inside annular gap.

* * * * *